United States Patent
Ramachandran et al.

(10) Patent No.: US 11,222,270 B2
(45) Date of Patent: Jan. 11, 2022

(54) USING LEARNED APPLICATION FLOW TO PREDICT OUTCOMES AND IDENTIFY TROUBLE SPOTS IN NETWORK BUSINESS TRANSACTIONS

(71) Applicant: International Business Machines Corporation, Armonk, NY (US)

(72) Inventors: Puthukode G. Ramachandran, Austin, TX (US); John C. Sanchez, Pflugerville, TX (US); Sophia A. Simpson, San Franciso, CA (US); Zhennan Wang, Austin, TX (US)

(73) Assignee: International Business Machiness Corporation, Armonk, NY (US)

( * ) Notice: Subject to any disclaimer, the term of this patent is extended or adjusted under 35 U.S.C. 154(b) by 871 days.

(21) Appl. No.: 15/222,831

(22) Filed: Jul. 28, 2016

(65) Prior Publication Data
US 2018/0032880 A1    Feb. 1, 2018

(51) Int. Cl.
| G06N 5/02 | (2006.01) |
| G06N 20/00 | (2019.01) |
| G06Q 10/06 | (2012.01) |
| G06Q 10/04 | (2012.01) |

(52) U.S. Cl.
CPC ............ *G06N 5/025* (2013.01); *G06N 20/00* (2019.01); *G06Q 10/04* (2013.01); *G06Q 10/0639* (2013.01)

(58) Field of Classification Search
CPC ........ G06Q 10/06; G06Q 20/00; G06Q 30/00; G06Q 10/0639; G06N 5/00; G06N 5/025
See application file for complete search history.

(56) References Cited

U.S. PATENT DOCUMENTS

| 6,233,570 | B1 | 5/2001 | Horvitz |
| RE37,431 | E | 10/2001 | Lanier |
| 7,565,340 | B2 | 7/2009 | Herlocker |
| 8,103,555 | B2 | 1/2012 | Lee |
| 8,166,135 | B2 | 4/2012 | Ganesh |
| 8,185,608 | B1 | 5/2012 | York |

(Continued)

OTHER PUBLICATIONS

Resul Das, Ibrahim Turkoglu, Extraction of Intersting Patterns Through Association Rule Mining for Improvement of Website Usability, 2009, Istanbul University, vol. 9, p. 1039 (Year: 2009).*

(Continued)

*Primary Examiner* — Alan Chen
(74) *Attorney, Agent, or Firm* — VanLeeuwen & VanLeeuwen; Brian D. Welle

(57) ABSTRACT

An approach is provided that receives, over a computer network, transaction data from a number of clients that are running an app. The approach generates association rules by inputting the transaction data to an association rule learning algorithm, such as an Apriori algorithm. Each association rule is based on a user transaction pattern and a desired result, and each association rule includes a generated confidence value that pertains to an expected performance of one of the steps included in the respective association rule. The app is then modified based on an analysis of the generated confidence values, with the app modification being directed towards improving one or more of the confidence values.

11 Claims, 8 Drawing Sheets

(56) References Cited

U.S. PATENT DOCUMENTS

| | | |
|---|---|---|
| 8,312,097 B1 | 11/2012 | Siegel |
| 8,386,966 B1 | 2/2013 | Attinasi |
| 8,396,815 B2 | 3/2013 | Drory |
| 8,468,110 B1 | 6/2013 | Podgorny |
| 8,606,725 B1 | 12/2013 | Agichtein |
| 8,671,089 B2 | 3/2014 | Yu |
| 8,694,355 B2 | 4/2014 | Bui |
| 8,843,484 B2 | 9/2014 | Gu |
| 8,972,567 B2 | 3/2015 | Vega |
| 9,015,099 B2 | 4/2015 | Nitz |
| 9,046,917 B2 * | 6/2015 | Senanayake ............ G06F 3/013 |
| 9,100,722 B2 | 8/2015 | Andrade |
| 9,501,745 B2 | 11/2016 | Nitz |
| 9,646,322 B2 | 5/2017 | Minnis |
| 10,025,805 B1 | 7/2018 | Jacobs, II |
| 10,163,058 B2 | 12/2018 | Nitz |
| 10,210,283 B2 | 2/2019 | Broz |
| 2002/0118220 A1 | 8/2002 | Lui |
| 2004/0039654 A1 | 2/2004 | Schambach |
| 2004/0095383 A1 | 5/2004 | Pfeifer |
| 2005/0138559 A1 | 6/2005 | Santos-Gomez |
| 2006/0036991 A1 | 2/2006 | Biazetti |
| 2007/0083407 A1 | 4/2007 | Allen |
| 2007/0162907 A1 | 7/2007 | Herlocker |
| 2008/0177726 A1 | 7/2008 | Forbes |
| 2008/0319827 A1 | 12/2008 | Yee |
| 2009/0307162 A1 | 12/2009 | Bui |
| 2010/0070346 A1 | 3/2010 | Davis |
| 2010/0076274 A1 | 3/2010 | Severson |
| 2010/0199181 A1 | 8/2010 | Robertson |
| 2010/0332430 A1 | 12/2010 | Caraviello |
| 2011/0314011 A1 | 12/2011 | Buehrer |
| 2012/0254405 A1 | 10/2012 | Ganesh |
| 2012/0284080 A1 | 11/2012 | De Oliveira |
| 2013/0151409 A1 * | 6/2013 | Stine ..................... G06Q 40/06 705/44 |
| 2013/0173419 A1 | 7/2013 | Farber |
| 2013/0179201 A1 | 7/2013 | Fuerstenberg |
| 2013/0311411 A1 | 11/2013 | Senanayake |
| 2013/0325448 A1 * | 12/2013 | Levien ..................... G10L 19/00 704/201 |
| 2014/0143018 A1 | 5/2014 | Nies |
| 2014/0201038 A1 | 7/2014 | Minnis |
| 2014/0298200 A1 * | 10/2014 | Cierniak ............. H04L 65/1069 715/753 |
| 2015/0081524 A1 | 3/2015 | Brereton |
| 2015/0287043 A1 | 10/2015 | Michaelis |
| 2015/0301729 A1 | 10/2015 | Wang |
| 2016/0044119 A1 | 2/2016 | Wirth |
| 2016/0071143 A1 | 3/2016 | Pokorney |
| 2016/0162912 A1 | 6/2016 | Garel |
| 2016/0379267 A1 | 12/2016 | Cecchi |
| 2017/0032274 A1 | 2/2017 | Yu |
| 2017/0093996 A1 | 3/2017 | Amalapurapu |
| 2017/0185913 A1 | 6/2017 | Codella |
| 2018/0012143 A1 | 1/2018 | Hansen |
| 2018/0089214 A1 | 3/2018 | Broz |

OTHER PUBLICATIONS

Anonymous, "Cognitive method for predicting emerging application requirements," IP.com No. IPCOM000245334D, Mar. 1, 2016, 4 pages.

Anonymous, "A method and approach to prevent unnecessary interactions in a Unit of Work based on predictive analysis of transaction branching," IP.com No. IPCOM000209597D, Aug. 10, 2011, 6 pages.

Ramachandran et al., "Using Learned Application Flow to Assist Users in Network Business Transaction Based Apps," U.S. Appl. No. 15/222,850, filed Jul. 28, 2016, 39 pages.

"List of IBM Patents or Patent Applications Treated as Related," Letter from Leslie A. Van Leeuwen, Jul. 28, 2016, 1 page.

Takács et al., "Customer Habit Analysis in an e-commerce System Using Soft Computing Based Methods," IEEE International Conference on Fuzzy Systems (FUZZ-IEEE), Aug. 2-5, 2015, 6 Pages.

IBM, "Commerce Retail Solutions," IBM Commerce, p. 1-3, https://www.ibm.com/commerce/US-en/industries/retail/?ink=header-menu. Accessed on Sep. 26, 2016.

"List of IBM Patents or Patent Applications Treated as Related," Letter from Leslie A. Van Leeuwen, Feb. 2, 2020, 1 page.

Kong et al., "Improving Passage Ranking with User Behavior Information," CIKM'13, Oct. 27-Nov. 1, 2013, p. 1999-2008, ACM, San Francisco, CA, USA.

Mell et al., "The NIST Definition of Cloud Computing," National Institute of Standards and Technology, Sep. 2011, p. 1-3, Special Publication 800-145.

Ames, "Just what they need, just when they need it: an introduction to embedded assistance," Proceedings of the 19th annual international conference on computer documentation, Oct. 2001, Santa Fe, New Mexico, pp. 111-115.

Ellison, "Embedded user assistance: The future for software help?" Interactions 14.1, 2007, 3 pages.

* cited by examiner

USING LEARNED APPLICATION FLOW TO PREDICT OUTCOMES AND IDENTIFY TROUBLE SPOTS IN NETWORK BUSINESS TRANSACTIONS

BACKGROUND OF THE INVENTION

Technical Field

This disclosure relates to learning an application flow through customer transactions to identify trouble spots in the application.

Description of Related Art

Analyses show that web or mobile application customers usually spend, on average, only a few seconds on each page navigating a site. Customers will often leave the application quickly if an application is found difficult or confusing to use. The difficulties may be caused by many reasons such as a bad user interface (UI) design, incompliant accessibility code, slow performance, code bugs, and the like. These difficulties cause not only customers' bad experience, but can also result in revenue losses from customers leaving the site.

Some customer experiment products use client code to capture the users' actions and events, and re-assemble them into a session. Business users replay the customers' sessions to see the actual customers' experience and isolate customer struggle points. While helpful, there are several drawbacks in using this approach. First, without reporting by specific customers, it is difficult for the business to identify which customers are struggling. Second, analysts at the business need to replay customers' sessions to actually see which interactions cause difficulty for the customers. This is very expensive and time consuming. And third, there is simple way of quantifying customer difficulties, such as the probability a customer will reach a certain goal, such as checkout and pay for an online shopping cart.

SUMMARY

An approach is provided that receives, over a computer network, transaction data from a number of clients that are running an app. The approach generates association rules by inputting the transaction data to an association rule learning algorithm, such as an Apriori algorithm. Each association rule is based on a user transaction pattern and a desired result, and each association rule includes a generated confidence value that pertains to an expected performance of one of the steps included in the respective association rule. The app is then modified based on an analysis of the generated confidence values, with the app modification being directed towards improving one or more of the confidence values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
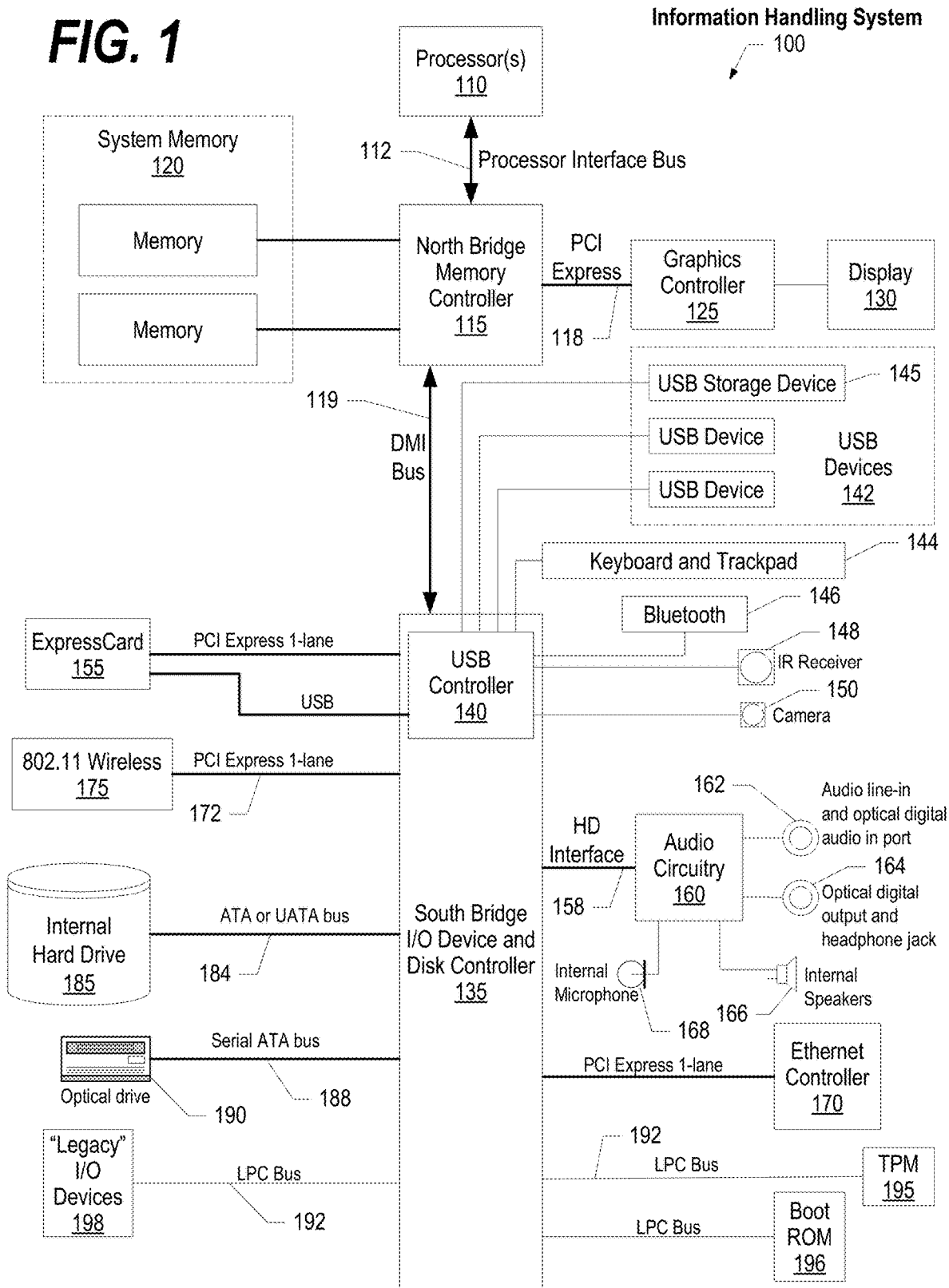
FIG. 1 depicts a block diagram of a processor and components of an information handling system.

FIGS. 1-8 show an approach for using a learned application flow to predict outcomes and identify trouble spots in network business transactions. A further approach is shown for using the learned application flow to assist users of network business transaction apps. This approach utilizes an association rule learning algorithm, such as the Apriori algorithm, to predict outcomes of business transactions and, in turn, identify areas of the business app where customers experience difficulty. To achieve this, customers' historical transaction data is collected and sent to an analysis server by application client code. The collected data is then analyzed and learned by the association rule learning algorithm to generate association rules. In one embodiment, each rule represents a transaction pattern that contains a set of customers' interactions with the app and a final goal. The customer interactions on web/mobile application are used as items of the association rule learning algorithm. For example, a customer interaction could be a button click, typing in form field, a screen's identifier, and the like. Examples of final goals can be "successful money transfer" or "successful shopping cart submission." Each rule also includes a confidence value generated by the association rule learning algorithm. The confidence value is the possibility, or probability, of a user reaching the final goal when the user traverses the interactions set forth in the rule.

At runtime, customers' interaction messages are sent to the analysis engine. The analysis engine uses the interaction messages to identify a matched rule. When a rule is matched, the matching rule's confidence value is used to predict the user's outcome, and to calculate how much the user will struggle to complete the next step in the rule.

As shown in further detail below, this approach programmatically analyzes customer interactions so that businesses can track multiple customers simultaneously. The approach further predicts customer outcomes in order to provide help to struggling customers that, in turn, reduces revenue losses from customers discontinuing use of the app.

The approach can be broken down into two parts: Data Leaning and customer struggling. Data Learning includes customer interaction capturing, data aggregation, generation of rules using the association rule learning algorithm. During customer interaction capturing, the system captures customers' interactions with the app. To capture the customers' interaction message, the web/mobile application is instrumented so that the client code sends messages to the analysis engine. When a customer uses the application, the user's interactions, such as button clicking, URL visiting, a form field typing, and some other application and user profile's data are sent to analysis engine. After the analysis engine get the message, it parses the message to identify each interaction and saves the interactions on the server. Each interaction is identified by a unique identification, which will be treated as an "item" when the association rule learning algorithm.

During data aggregation, the gathered data is aggregated for eventual input into the association rule learning algorithm. A web/mobile application can provide multiple functions to its customers. For example, a banking application may have functions such as paying bills, transferring money from one account to another account, and making loan payments. Association rule learning algorithm, such as the Apriori algorithm, terminology "transaction" refers to customers' processes of certain functions. To support multi-transaction prediction, a property file is used with the properties including transaction's IDs, their starting points and their ending points so that the analysis engine can identify where a particular transaction starts and ends. An example of a property file is shown below:

```
{
    "transactions":[
        {
            "id":"PayBill",
            "txStart":"UI-id-1",
            "txEnd":"UI-id-2"
        },
        {
            "id":"TransferMoney",
            "txStart":"UI-id-3",
            "txEnd":"UI-id-4"
        }
    ]
}
```

The analysis engine processes the transaction data collected from the messages sent from customer apps to generate training data that is used as an input to the association rule learning algorithm. During this process, the customer interactions are grouped into transactions, and are also sorted by time, called "steps." Below is an example of training data in JSON format:

```
{
    "transaction":"PayBill",
    "steps":[
        {
            "id":"UI-id-1"
        },
        {
            "id":"UI-id-a"
        },
        {
            "id":"UI-id-b"
        },
        {
            "id":"UI-id-c"
        },
        {
            "id":"UI-id-2"
        }
    ]
}
```

Generation of rules using an association rule learning algorithm such as the Apriori algorithm uses the training data as input data. When inputting the association result as the last step, for example the "UI-id-2" step shown below, one of generated rules will include the confidence value that corresponds to the possibility that such last step will be performed by the user. An example, in JSON format, might appear as follows:

```
{
    "transaction":"PayBill",
    "steps":[
        "UI-id-1"
        "UI-id-b"
        "UI-id-2"
    ],
    "support":0.06557377049180330,
    "confidence":0.8,
    "lift":3.48571428571429
}
```

The rule shown in the example above might be understood as: if a customer is paying his utility bill from a web/mobile application, after he finished step "UI-id-1" and step "UI-id-b", he would have 80% probability to do step "UI-id-2".

At runtime, customers' completed interaction messages are captured as described above and in further detail herein. The analysis engine takes the steps that a customer has completed to find matching rules. The approach identifies areas of the app where the users struggle by finding a rule that contains all of the customer's steps as well as the transaction's end steps. If the confidence value associated with this rule is low, then customers are struggling to complete the transaction. The analysis engine also predicts the steps the customer is most likely going to perform from the current step. To perform this function, the analysis engine retrieves rules that contain all of the steps that a customer has already completed and one additional step (the last step in the rule). The analysis engine compares the confidence values of the retrieved rules and can then suggest a path, or next step, to the customer that corresponds with the rule that has the highest confidence value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
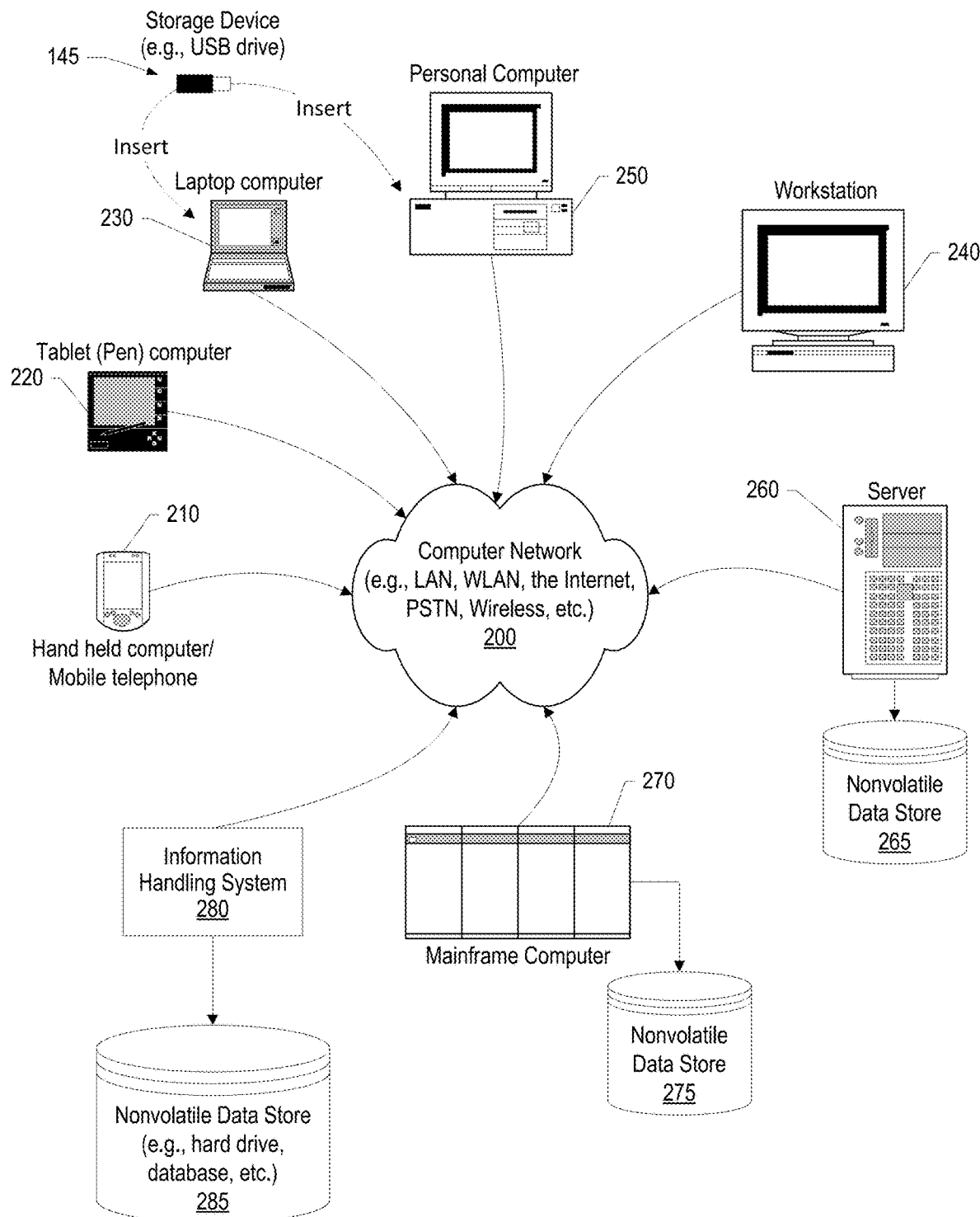
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
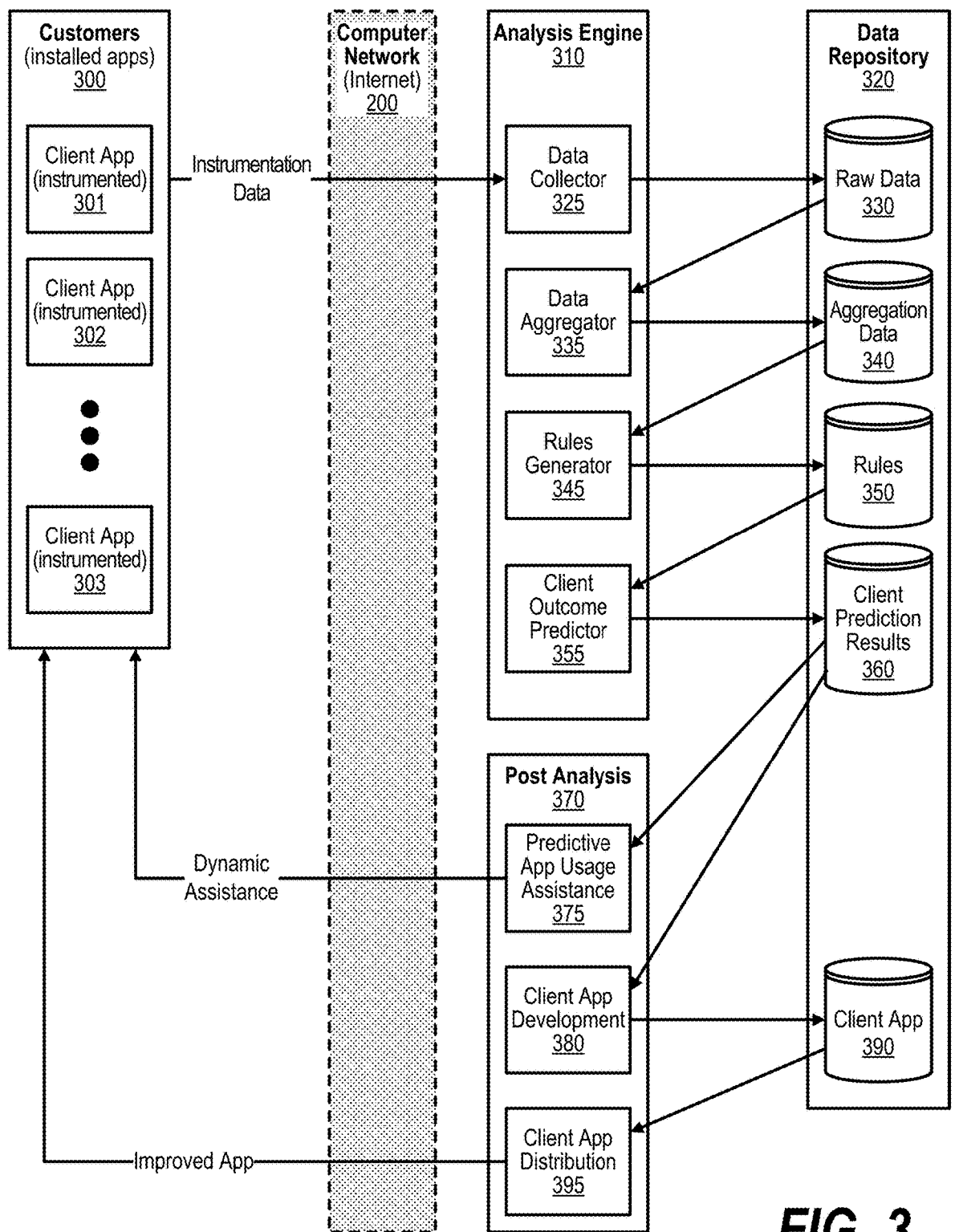
FIG. 3 is a diagram system interaction diagram depicting interaction between customers, the transaction analysis engine, and post analysis processing.

FIG. 3 is a diagram system interaction diagram depicting interaction between customers, the transaction analysis engine, and post analysis processing. Customers, also referred to as users or clients, install an app, also referred to as an "application," on their information handling system, such as a mobile device, smart phone, computer system, or the like. In one embodiment, the installed apps are instrumented to send messages in order to send messages back to analysis engine 310. Any number of client apps can be utilized, depicted in the example shown as client apps 301, 302, through 303.

Analysis engine 310 receives the transaction data from the apps that are being run by the users, or clients. Analysis engine 310 is depicted as having four main processes: data collector process 325, data aggregator process 335, rules generator process 345, and client outcome predictor process 355. Data gathered or maintained by the various analysis engine processes is stored in data repository 320. Data collector process 325 stores the raw data gathered from clients in raw data store 330. Data aggregator process 335 retrieves raw data from data store 330, aggregates the data, and stores the aggregated data in aggregation data store 340. Rules generator process 345 receives aggregated data from data store 340 and uses the aggregated data as input to an association rule learning algorithm that generates rules that are stored in rules data store 350. Client outcome predictor process 355 retrieves rules from data store 350 and uses confidence values included in the rules to make client prediction results that are stored in client prediction results data store 360.

Post analysis processing 370 uses client prediction results to improve the app that is being utilized by customers, or clients. Post analysis process 370 includes predictive app usage assistance process 375 that provides dynamic assistance to apps based on steps being performed at the respective apps. Client app development process 380 makes improvements to client app 390 based on the confidence values included in rules 350 that have been developed based on numerous sets of transaction data received from the various installed apps. Finally, client app distribution process 395 distributes improved client app 390 to the various clients.

Figure 4:
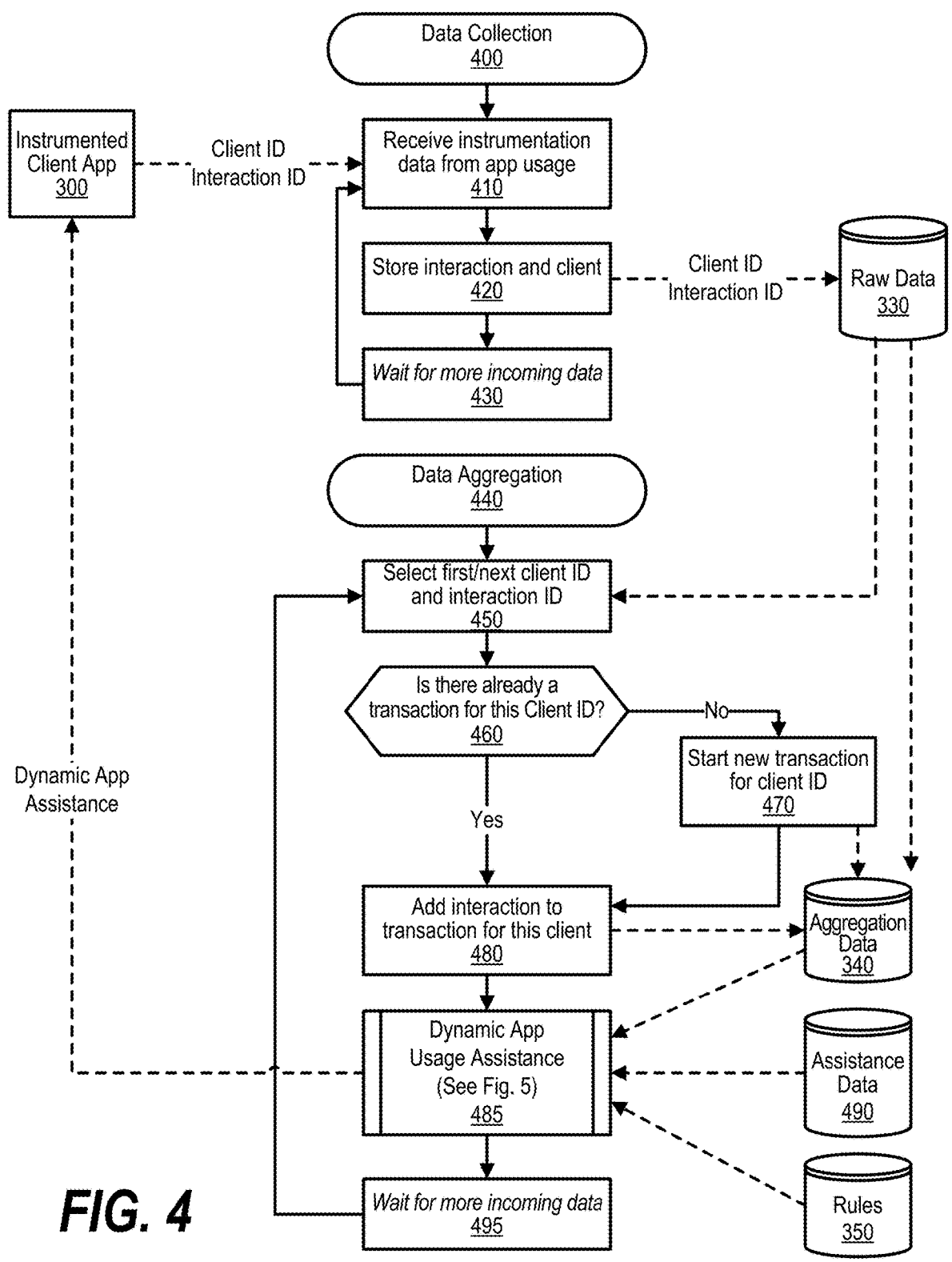
FIG. 4 is a flowchart showing steps taken during data collection of client transactions and data aggregation of such transaction data.

FIG. 4 is a flowchart showing steps taken during data collection of client transactions and data aggregation of such transaction data. FIG. 4 processing shows the steps taken by a process that performs a data collection routine and a data aggregation routine. The data collection routine is shown commencing at 400 and includes steps 410 through 430. Meanwhile, the data aggregation routine is shown commencing at 440 and includes steps 450 through 495.

During data collection, steps 410, 420, and 430 are performed. At step 410, the process receives instrumentation data corresponding to app usage by one of the clients, represented by client 300. Instrumentation data is data pertaining to a transaction performed by the client at the app, such as a button click, an edited field, or the like. In one embodiment, the transaction data includes a client identifier that identifies the particular client that is transmitting the transaction data along with an interaction identifier that uniquely identifies the transaction, or event, detected as being performed at the app on the client's device. At step 420, the process stores the interaction and client identifiers in raw data store 330. At step 430, the data collection process waits for more incoming data to arrive from one of the clients. When more data arrives, the data collection process will loop back to step 410 to receive and store the incoming data as described above.

The data aggregation routine is shown commencing at 440 and includes steps 450 through 495. At step 450, the process selects the first client identifier and interaction identifier from raw data store 330. The process determines as to whether there is already a transaction established for this client identifier (decision 460). If there is already a transaction established for this client identifier, then decision 460 branches to the 'yes' branch to perform step 480. On the other hand, if there is not already a transaction established for this client identifier, then decision 460 branches to the 'no' branch whereupon step 470 is performed. At step 470, the process starts new transaction for the received client identifier and stores the new transaction in aggregation data store 340. At step 480, the process adds the interaction identifier to the transaction that has been established for this client. The interaction identifier is stored with the transaction in aggregation data store 340.

Figure 5:
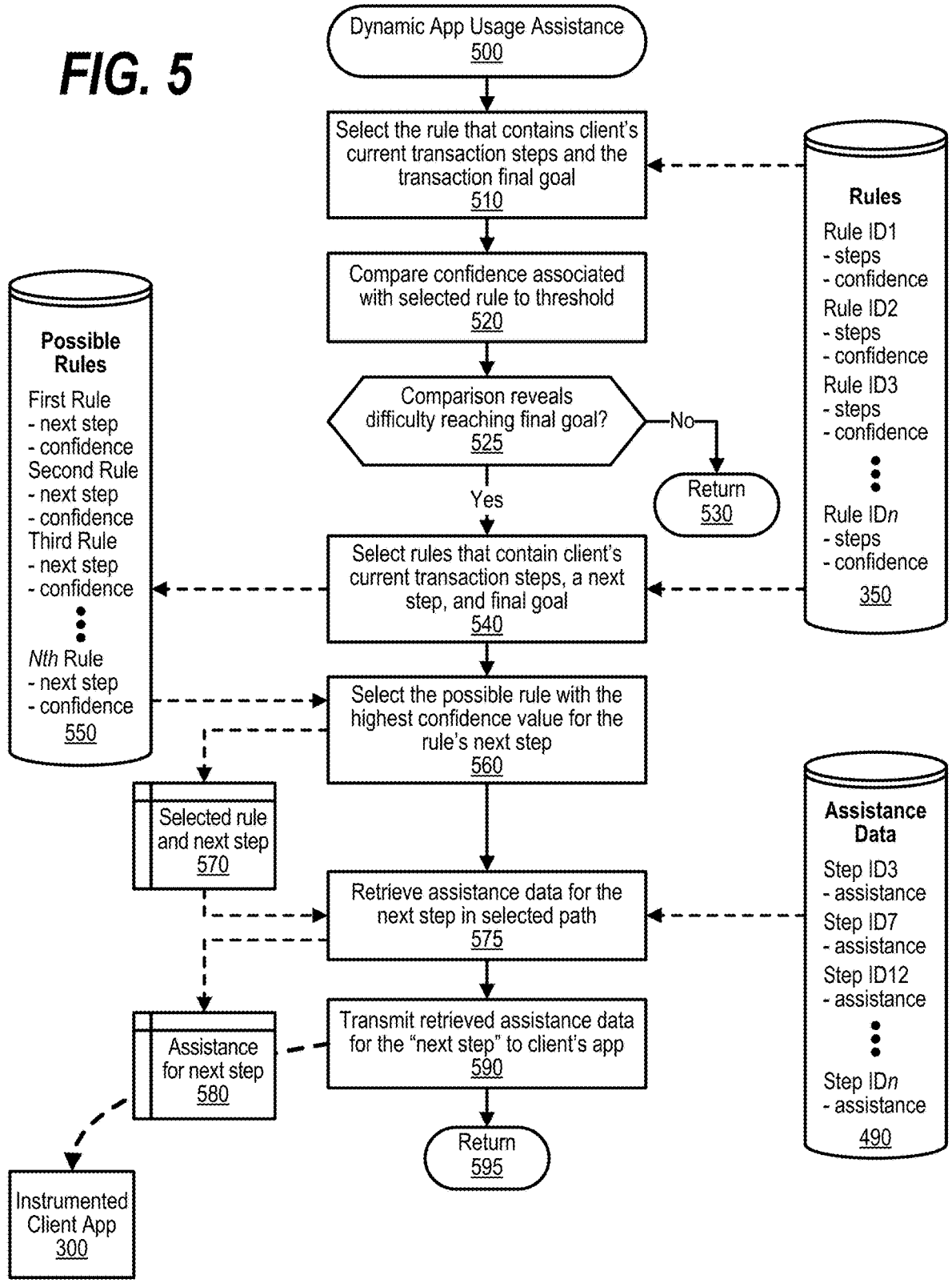
FIG. 5 is a flowchart showing steps taken to provide dynamic assistance to application users based on identifying areas of difficulty within the application from learned application flows.

At predefined process 485, the process performs the Dynamic App Usage Assistance routine (see FIG. 5 and corresponding text for processing details). Predefined process 485 utilizes aggregation data from data store 340, assistance data from data store 490, and rules data from data store 350 to provide dynamic assistance to users of the app. At step 495, the data aggregation routine waits for more incoming data to arrive in raw data store 330. When data arrives, processing loops back to step 450 to perform the data aggregation steps on the newly arrived data as described above.

FIG. 5 is a flowchart showing steps taken to provide dynamic assistance to application users based on identifying areas of difficulty within the application from learned application flows. FIG. 5 processing commences at 500 and shows the steps taken by a process that performs a dynamic app usage assistance routine. At step 510, the process selects the rule that contains client's current transaction steps and the transaction final goal. The rules are selected from rules data store 350. At step 520, the process compares the confidence value associated with selected rule to a threshold. The process next determines as to whether the comparison reveals difficulty reaching the final goal (decision 525). If the comparison reveals difficulty reaching the final goal, then decision 525 branches to the 'yes' branch to perform steps 540 through 595. On the other hand, if the comparison does not reveal difficulty reaching the final goal, then decision 525 branches to the 'no' branch and processing returns to the calling routine (see FIG. 4) at 530.

At step 540, the process selects one or more rules that contain the client's current transaction steps, a next step, and final goal. These represent "possible" rules and are stored in data store 550. At step 560, the process selects the possible rule that has the highest confidence value for the rule's next step. In other words, the process selects a rule where it is more likely that the client will be successful in performing the next step. The selected possible rule is stored in memory area 570. At step 575, the process retrieves assistance data corresponding to the next step that is stored in memory area 570 with the assistance data being retrieved from data store 490. The assistance data is stored in memory area 580. At step 590, the process transmits the retrieved assistance data for the "next step" to client's app 300. FIG. 5 processing thereafter returns to the calling routine (see FIG. 4) at 595.

Figure 6:
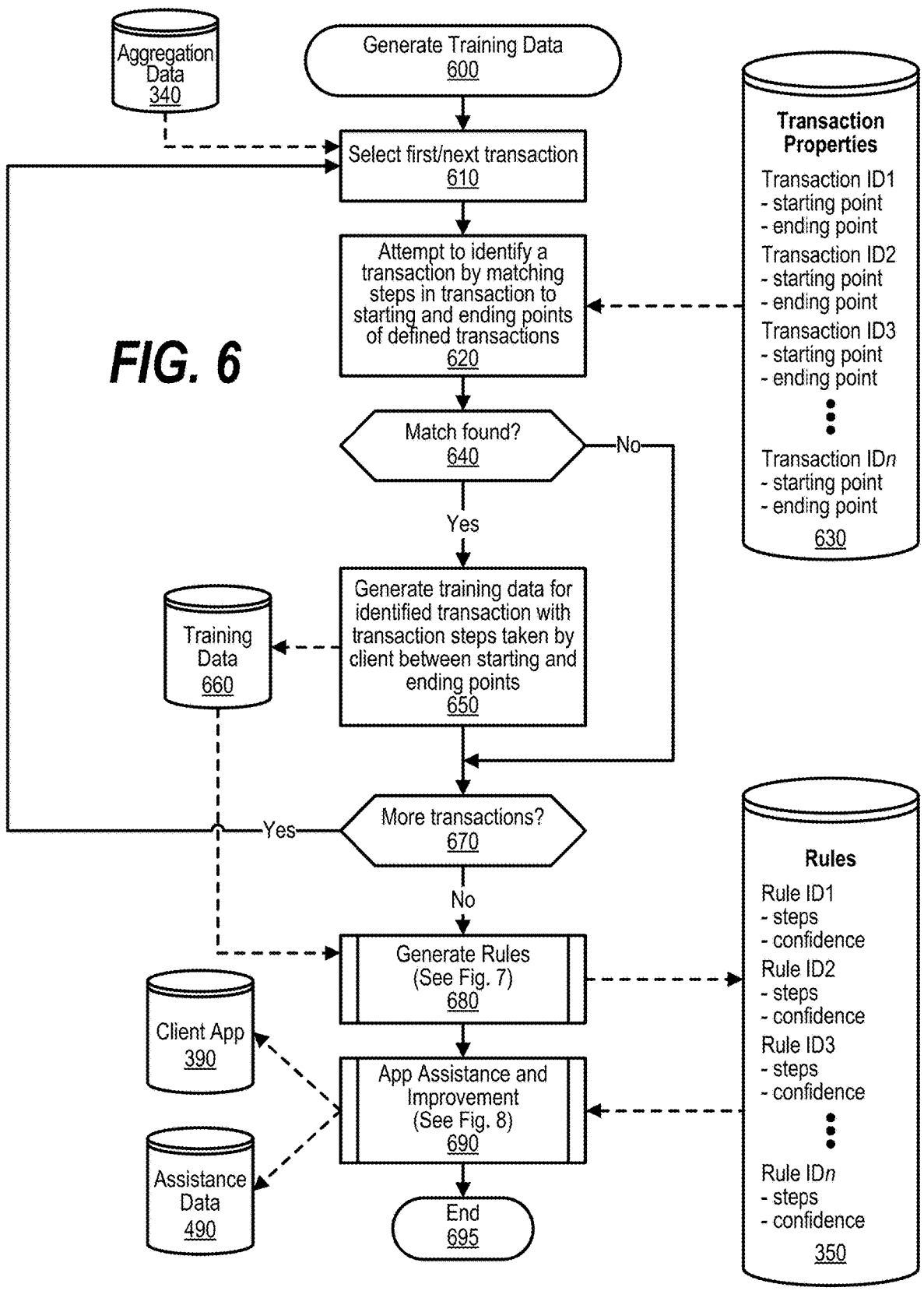
FIG. 6 is a flowchart showing steps taken to generate training data that is used as an input to an association rule learning algorithm.

FIG. 6 is a flowchart showing steps taken to generate training data that is used as an input to an association rule learning algorithm. FIG. 6 processing commences at 600 and shows the steps taken by a process that generates training data that is used as input to an association rule learning algorithm. At step 610, the process selects the first transaction from aggregation data store 340. At step 620, the process attempts to identify a transaction by matching steps in transaction retrieved from data store 340 to starting and ending points of defined transactions that have been defined in transaction properties data store 630.

The process determines as to whether step 620 was able to find a match (decision 640). If a match was found, then decision 640 branches to the 'yes' branch to perform step 650. On the other hand, if a match was not found, then decision 640 branches to the 'no' branch bypassing step 650. At step 650, the process generates training data for the identified transaction by using the transaction steps taken by the client between the starting and ending points. The training data is stored in data store 660. The process determines as to whether there are more transactions to process from the aggregation data store (decision 670). If there are more transactions to process, then decision 670 branches to the 'yes' branch which loops back to step 610 to select and process the next transaction from data store 340. This looping continues until all of the transactions have been processed, at which point decision 670 branches to the 'no' branch exiting the loop.

Figure 7:
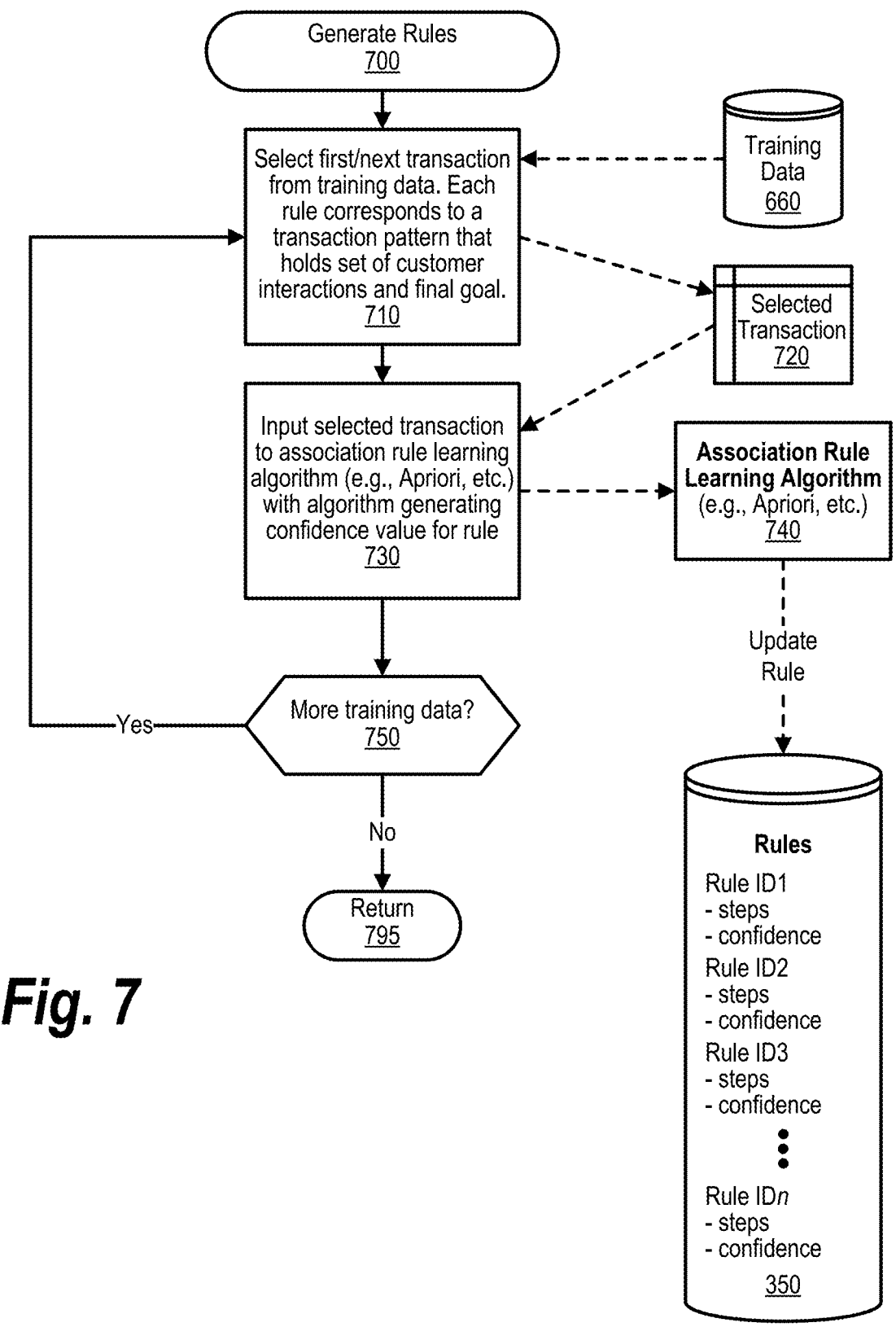
FIG. 7 is a flowchart showing steps taken to generate rules by the association rule learning algorithm based on the generated training data.

After all of the transactions have been processed then, at predefined process 680, the process performs the Generate Rules routine (see FIG. 7 and corresponding text for processing details). Predefined process 680 takes training data from data store 660 as input and generates rules that are stored in rules data store 350. At predefined process 690, the process performs the App Assistance and Improvement routine (see FIG. 8 and corresponding text for processing details). This routine takes rules as an input and identifies those steps with low confidence values. Identified steps with low confidence values are used to make improvements to client app 390 as well as develop assistance data 490 that can be delivered to client apps to assist users. FIG. 6 processing thereafter ends at 695.

FIG. 7 is a flowchart showing steps taken to generate rules by the association rule learning algorithm based on the generated training data. FIG. 7 processing commences at 700 and shows the steps taken by a process that generates rules using an association rule learning algorithm. At step 710, the process selects the first transaction from training data store 660. Each rule corresponds to a transaction pattern that holds set of customer interactions and a final goal. The selected transaction is depicted as being stored in memory area 720. At step 730, the process inputs the selected transaction from memory area 720 to association rule learning algorithm 740, such as the Apriori algorithm, with the algorithm generating a confidence value for the rule. The updated rules are reflected in data store 350. In one embodiment, the confidence value pertains to the chance, or probability, that the last step of a given rule will be performed based on the historical data represented in the training data store. The process determines as to whether there is more training data to process (decision 750). If there is more training data to process, then decision 750 branches to the 'yes' branch which loops back to step 710 to select and process the next transaction from training data store 660. This looping continues until there is no more training data to process, at which point decision 750 branches to the 'no' branch exiting the loop. FIG. 7 processing thereafter returns to the calling routine (see FIG. 6) at 795.

Figure 8:
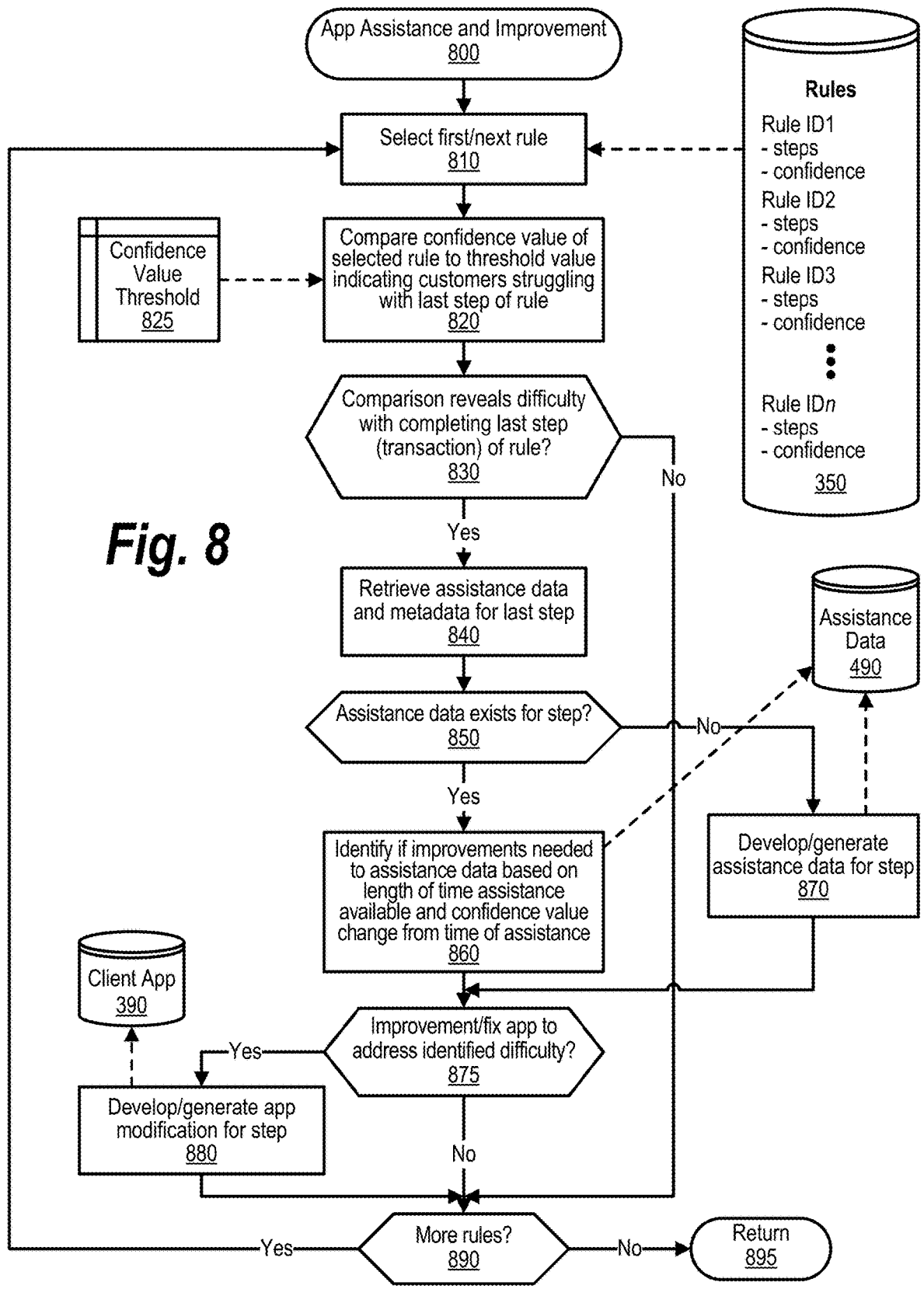
FIG. 8 is a flowchart showing steps taken to identify areas of difficulty based on the generated rules with such areas of difficulty used to develop assistance for dynamic delivery to users as well as improve the application by modifying the website to alleviate or lessen identified areas of difficulty.

FIG. 8 is a flowchart showing steps taken to identify areas of difficulty based on the generated rules with such areas of difficulty used to develop assistance for dynamic delivery to users as well as improve the application by modifying the website to alleviate or lessen identified areas of difficulty. FIG. 8 processing commences at 800 and shows the steps taken by a process that performs the app assistance and improvement routine. At step 810, the process selects the first rule from rules data store 350. At step 820, the process compares the confidence value of the selected rule to a confidence threshold value from memory area 825 that indicates a level where customers are deemed to be struggling with the last step of any given rule.

The process determines as to whether the comparison reveals difficulty with completing the last step (transaction) of the selected rule (decision 830). If the comparison reveals difficulty with completing the last step of the selected rule, then decision 830 branches to the 'yes' branch to perform step 840. On the other hand, if the comparison does not reveal difficulty with completing the last step of the selected rule, then decision 830 branches to the 'no' branch bypassing the remaining steps and resuming prior to decision 890.

At step 840, the process attempts to retrieve assistance data and metadata corresponding to the last step of the rule found to be difficult to perform by users. The process determines as to whether any assistance data currently exists for the step (decision 850). If assistance data exists for the step, then decision 850 branches to the 'yes' branch to perform step 860. On the other hand, if assistance data does not yet exist for the step, then decision 850 branches to the 'no' branch to perform step 870. At step 860, the process identifies if improvements are needed to the assistance data based on the length of time that the assistance data has been available to users and the confidence value change since the assistance data has been made available. Any such improvements to the assistance data are reflected as updates to assistance data 490. At step 870, the process develops, or generates, assistance data for the step. The newly developed assistance data is stored in assistance data store 490.

The process determines as to whether there are any improvements, or fixes, identified for the app to address identified difficulty with the step (decision 875). If any improvements are identified to address the difficulty, then decision 875 branches to the 'yes' branch to perform step 880. On the other hand, if no improvements are identified to address the difficulty, then decision 875 branches to the 'no' branch bypassing step 880. At step 880, the process develops app modifications designed to improve the step. The goal of the modifications is to have the step of the app be easier to perform by users and, consequently, result in a higher confidence score in the rules. The process determines as to whether there are more rules in data store 350 to process (decision 890). If there are more rules to process, then decision 890 branches to the 'yes' branch which loops back to step 810 to select and process the next rule from data store 350 as described above. This looping continues until all of the rules have been processed, at which point decision 890 branches to the 'no' branch exiting the loop. FIG. 8 processing thereafter returns to the calling routine (see FIG. 7) at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving, over a computer network, a plurality of transactions from a plurality of clients running an app, wherein a selected one of the plurality of transactions comprises a plurality of interactions with the app;
   generating a set of training data based on the selected transaction in response to matching the corresponding plurality of interactions to a starting point and an ending point included in one of a plurality of predefined transaction properties;
   generating a plurality of association rules by inputting the set of training data into an association rule learning algorithm, wherein each one of the plurality of association rules is based on a transaction pattern comprising a set of the plurality of interactions and a last step of the transaction pattern;
   generating a set of assistance data to assist in reaching the last step of the transaction pattern;
   in response to providing the set of assistance data to a first set of users, determining that the last step of the transaction pattern is difficult to reach based on comparing a confidence value corresponding to a selected one of the plurality of association rules to a threshold;
   modifying the set of assistance data in response to the determining, wherein the modified set of assistance data provides information on how to reach the last step of the transaction pattern; and
   displaying the modified set of assistance data to a second set of users using the application to assist the second set of users in reaching the last step of the transaction pattern.

2. The method of claim 1 wherein the association rule learning algorithm is an Apriori algorithm.

3. The method of claim 1 further comprising:
   storing the received plurality of transactions as raw data;
   aggregating the raw data to form the set of training data; and
   identifying a set of client prediction results based on the confidence values that are associated with the last step of each of the plurality of association rules.

4. The method of claim 1 wherein the method further comprises:
   transmitting the modified set of assistance data to a set of clients running the app and corresponding to the second set of users, wherein the modified assistance data is configured to be displayed when one of the set of clients is about to perform the last step included in the selected association rule.

5. An information handling system comprising:
   one or more processors;
   a memory coupled to at least one of the processors;
   a touch-enabled display screen accessible by at least one of the processors; and
   a set of computer program instructions stored in the memory and executed by at least one of the processors in order to perform actions comprising:
      receiving, over a computer network, a plurality of transactions from a plurality of clients running an app, wherein a selected one of the plurality of transactions comprises a plurality of interactions with the app;
      generating a set of training data based on the selected transaction in response to matching the corresponding plurality of interactions to a starting point and an ending point included in one of a plurality of predefined transaction properties;
      generating a plurality of association rules by inputting the set of training data into an association rule learning algorithm, wherein each one of the plurality of association rules is based on a transaction pattern comprising a set of the plurality of interactions and a last step of the transaction pattern;
      generating a set of assistance data to assist in reaching the last step of the transaction pattern;
      in response to providing the set of assistance data to a first set of users, determining that the last step of the transaction pattern is difficult to reach based on comparing a confidence value corresponding to a selected one of the plurality of association rules to a threshold;
      modifying the set of assistance data in response to the determining, wherein the modified set of assistance data provides information on how to reach the last step of the transaction pattern; and
      displaying the modified set of assistance data to a second set of users using the application to assist the second set of users in reaching the last step of the transaction pattern.

6. The information handling system of claim 5 wherein the association rule learning algorithm is an Apriori algorithm.

7. The information handling system of claim 5 wherein the actions further comprise:
   storing the received plurality of transactions as raw data;
   aggregating the raw data to form the set of training data; and
   identifying a set of client prediction results based on the confidence values that are associated with the last step of each of the plurality of association rules.

8. The information handling system of claim 5 wherein the actions further comprise:
   transmitting the modified set of assistance data to a set of clients running the app and corresponding to the second set of users, wherein the modified assistance data is configured to be displayed when one of the set of clients is about to perform the last step included in the selected association rule.

9. A computer program product stored in a computer readable storage medium, comprising computer program code that, when executed by an information handling system, performs actions comprising:
   receiving, over a computer network, a plurality of transactions from a plurality of clients running an app, wherein a selected one of the plurality of transactions comprises a plurality of interactions with the app;
   generating a set of training data based on the selected transaction in response to matching the corresponding plurality of interactions to a starting point and an ending point included in one of a plurality of predefined transaction properties;
   generating a plurality of association rules by inputting the set of training data into an association rule learning algorithm, wherein each one of the plurality of association rules is based on a transaction pattern comprising a set of the plurality of interactions and a last step of the transaction pattern;

generating a set of assistance data to assist in reaching the last step of the transaction pattern;

in response to providing the set of assistance data to a first set of users, determining that the last step of the transaction pattern is difficult to reach based on comparing a confidence value corresponding to a selected one of the plurality of association rules to a threshold;

modifying the set of assistance data in response to the determining, wherein the modified set of assistance data provides information on how to reach the last step of the transaction pattern; and displaying the modified set of assistance data to a second set of users using the application to assist the second set of users in reaching the last step of the transaction pattern.

10. The computer program product of claim 9 wherein the association rule learning algorithm is an Apriori algorithm.

11. The computer program product of claim 9 wherein the actions further comprise:

storing the received plurality of transactions as raw data;

aggregating the raw data to form the set of training data; and identifying a set of client prediction results based on the confidence values that are associated with the last step of each of the plurality of association rules.

\* \* \* \* \*